(12) United States Patent
Schlueter

(10) Patent No.: US 12,443,602 B2
(45) Date of Patent: Oct. 14, 2025

(54) COMPARING DATASETS USING HASH VALUES OVER A SUBSET OF FIELDS

(71) Applicant: SAP SE, Walldorf (DE)

(72) Inventor: Ulrich Schlueter, Schriesheim (DE)

(73) Assignee: SAP SE, Walldorf (DE)

( * ) Notice: Subject to any disclaimer, the term of this patent is extended or adjusted under 35 U.S.C. 154(b) by 273 days.

(21) Appl. No.: 17/391,824

(22) Filed: Aug. 2, 2021

(65) Prior Publication Data
US 2023/0033054 A1    Feb. 2, 2023

(51) Int. Cl.
| G06F 16/2455 | (2019.01) |
| G06F 16/13 | (2019.01) |
| G06F 16/14 | (2019.01) |
| G06F 16/21 | (2019.01) |
| G06F 16/22 | (2019.01) |
| H04L 9/06 | (2006.01) |
| H04L 9/32 | (2006.01) |

(52) U.S. Cl.
CPC ...... *G06F 16/24558* (2019.01); *G06F 16/137* (2019.01); *G06F 16/152* (2019.01); *G06F 16/219* (2019.01); *G06F 16/2255* (2019.01); *H04L 9/0643* (2013.01); *H04L 9/3247* (2013.01)

(58) Field of Classification Search
CPC ........... G06F 16/24558; G06F 16/2255; G06F 16/137; G06F 16/152; G06F 16/219; H04L 9/0643; H04L 9/3247
See application file for complete search history.

(56) References Cited

U.S. PATENT DOCUMENTS

| 5,819,268 A | 10/1998 | Hackett | |
| 6,098,079 A | 8/2000 | Howard | |
| 6,367,012 B1* | 4/2002 | Atkinson | G06F 21/64 |
| | | | 713/176 |
| 6,820,114 B2 | 11/2004 | Brendle | |
| 8,140,470 B2 | 3/2012 | Kemmler | |
| 9,280,331 B2 | 3/2016 | Arnold et al. | |
| 10,002,372 B2 | 6/2018 | Golec et al. | |
| 10,007,826 B2* | 6/2018 | Ebrahimi | G06K 19/06112 |
| 10,075,298 B2* | 9/2018 | Struttmann | H04L 9/3236 |

(Continued)

OTHER PUBLICATIONS

Opacki, "How to compare database changes based on transaction journals", available from https://opacki.eu/autoinstalator/joomla/home/item/235-how-to-compare-database-changes-based-on-transaction-journals, pp. 1-4, Oct. 2012.

(Continued)

*Primary Examiner* — Vaishali Shah
(74) *Attorney, Agent, or Firm* — Klarquist Sparkman, LLP

(57) ABSTRACT

Relevant content of datasets is compared by computing a hash value over a selected subset of fields to obtain a signature of a dataset, with other fields being disregarded. A hash value can be computed directly for all records of the dataset, or by combining individual hash values for each record. Comparison of the signature with that of other datasets leads to efficient determination whether two datasets match with respect to relevant content in the selected fields. For larger groups of datasets, lists of matched and mismatched datasets can be reported. Optional features include matches insensitive to permutation of the records, or identification of which records in a dataset fail to match.

17 Claims, 10 Drawing Sheets

(56) References Cited

U.S. PATENT DOCUMENTS

| | | | |
|---|---|---|---|
| 10,298,401 B1* | 5/2019 | Goldberg | H04L 63/02 |
| 10,394,781 B2 | 8/2019 | Ritter et al. | |
| 10,437,853 B2 | 10/2019 | Bantupalli et al. | |
| 10,616,338 B1* | 4/2020 | Gupta | H04L 67/1097 |
| 10,757,089 B1* | 8/2020 | Hohler | H04L 63/0807 |
| 10,803,043 B2 | 10/2020 | Ma et al. | |
| 11,030,187 B1* | 6/2021 | Boodman | G06F 16/235 |
| 11,263,341 B1* | 3/2022 | Pihur | G06F 21/6245 |
| 2002/0065912 A1* | 5/2002 | Catchpole | H04L 9/40 |
| | | | 713/168 |
| 2006/0041754 A1* | 2/2006 | Hind | G06Q 20/3674 |
| | | | 713/176 |
| 2006/0253423 A1* | 11/2006 | McLane | G06F 16/951 |
| 2008/0082585 A1* | 4/2008 | Elgezabal | G06F 21/552 |
| 2008/0103949 A1 | 5/2008 | Lobana et al. | |
| 2009/0307240 A1* | 12/2009 | Basile | G06Q 20/383 |
| 2010/0082494 A1* | 4/2010 | Saxena | G06Q 20/32 |
| | | | 235/379 |
| 2010/0232434 A1* | 9/2010 | Xu | H04L 45/00 |
| | | | 370/392 |
| 2010/0254391 A1* | 10/2010 | Kramer | H04L 45/745 |
| | | | 370/395.32 |
| 2010/0332791 A1* | 12/2010 | Xu | G06F 16/24542 |
| | | | 711/216 |
| 2012/0072413 A1* | 3/2012 | Castellanos | G06F 16/217 |
| | | | 707/718 |
| 2014/0172547 A1* | 6/2014 | Subramanian | G06Q 30/0246 |
| | | | 705/14.45 |
| 2014/0298034 A1* | 10/2014 | Watanabe | H04L 9/3236 |
| | | | 713/176 |
| 2016/0378752 A1* | 12/2016 | Anderson | G06F 16/2255 |
| | | | 707/747 |
| 2017/0140020 A1* | 5/2017 | Greenlee | G06F 16/273 |
| 2018/0227131 A1* | 8/2018 | Ebrahimi | H04L 9/3297 |
| 2019/0220829 A1* | 7/2019 | Ripley | G06Q 10/30 |
| 2019/0286841 A1 | 9/2019 | Staub et al. | |
| 2020/0050795 A1* | 2/2020 | Solomon | G06F 16/2255 |
| 2020/0403797 A1 | 12/2020 | Certain et al. | |
| 2021/0097059 A1* | 4/2021 | Huang | G06F 16/219 |
| 2021/0297265 A1* | 9/2021 | Huang | G06F 16/2379 |
| 2022/0035546 A1* | 2/2022 | Park | G06F 3/0679 |
| 2022/0131692 A1* | 4/2022 | Alston | H04L 67/133 |

OTHER PUBLICATIONS

Schmidt, "Conversion to SAP S/4HANA—Consistency checks in Finance", available from https://blogs.sap.com/2018/08/13/conversion-to-sap-s4hana-consistency-checks-in-finance-part-1/, pp. 1-11, Aug. 2018.

Xiong, "T-SQL—Compare Records Using Hash Values", available from https://www.johnxiong.com/2018/01/04/t-sql-compare-records-using-hash-values/, 7 pages, Jan. 2018.

* cited by examiner

COMPARING DATASETS USING HASH VALUES OVER A SUBSET OF FIELDS

BACKGROUND

Software applications continue to advance in a multitude of endeavors. Automation provides numerous benefits including, in many instances, reduction in clerical errors. However, situations persist where two versions of data often contain the same substance but, for reasons of maintaining flexibility, rote replication from one version to the other cannot be enforced. Accordingly, it can be desirable to verify that the two versions of data contain the same substance. Some conventional techniques rely on detailed or manually-assisted comparison of data fields, which can be tedious or at risk of further error. Other conventional techniques can perform comparison in bulk but are unable to distinguish between content fields and other fields, thereby indicating a mismatch when in fact the content in two versions is the same. Accordingly, there remains a need for improved technologies to provide relevant comparisons of two or more datasets.

SUMMARY

In summary, the disclosed technologies are directed to various innovative technologies for efficiently comparing salient features of two or more datasets. In examples, a hash value is computed over a selected subset of fields for multiple records in a dataset. The hash value can be used as a signature of the dataset, or a signature can be derived from the hash value. Signatures of two or more datasets can be compared to determine whether the relevant substance of the datasets (in the selected subset of fields) is matched.

In certain examples, the disclosed technologies can be implemented as a computer-implemented method. A first hash value of a selected subset of fields for a first plurality of data records is compared with a corresponding second hash value of the selected subset of fields of a second plurality of data records. Responsive to determining that the first hash value matches the second hash value, a match is indicated between the first and second pluralities of data records.

In some examples, the first hash value can be computed as the direct result of applying a hash function to a collection of all fields of the selected subset of fields over all data records of the first plurality of data records. In other examples, the first hash value can be determined by extracting at least parts of the first plurality of data records from one or more database tables; serializing the selected subset of fields of the first plurality of data records to obtain a sequence of tokens; and applying a hash function to the sequence of tokens, thereby obtaining the first hash value. The sequence of tokens can be in a JSON format.

In further examples, the first hash value can be computed from a plurality of individual hash values for respective data records of the first set of data records. Each of the individual hash values can be computed over all fields of the selected subset of fields belonging to the respective data record. The first hash value can be a first signature of the first plurality of data records, and the method can further include storing the first signature on a non-transitory storage medium. Responsive to a request to compare the first plurality of data records with a third plurality of data records (the request being received from a client subsequent to storing the first signature), the first signature can be retrieved from the non-transitory storage medium, and the first signature can be compared with a third signature of the third plurality of data records. A result of the comparing the first and third signatures can be returned to the client. In varying examples, the first hash value can be independent of an order of the individual hash values, or the first hash value can be sensitive to an order of the individual hash values.

In additional examples, prior to the comparing of the hash values, a request can be received from a client to compare the first plurality of data records and the second plurality of data records. Identifiers of the fields in the selected subset of fields can be retrieved from stored metadata. Still further, the first hash value of the first plurality of data records can be stored as a first signature of the first plurality of data records. A request to update one or more records of the first plurality of data records can be received. Responsive to determining that the first signature exists, the request can be rejected.

In certain examples, the disclosed technologies can be implemented as computer-readable media storing instructions executable on hardware processors. Execution of the instruction causes the following operations to be performed. A first data block having a plurality of records is received. Each record has a plurality of significant fields and, complementary to the significant fields, one or more deprecated fields. A first signature of the first data block is computed. The first signature is computed for the plurality of records over the significant fields using one or more hash functions. Computation of the first signature disregards the deprecated fields. A request to compare the first data block with a second data block is received. The first signature is compared with a second signature of the second data block. Responsive to a determination that the first signature matches the second signature, a match indication is returned in response to the request. Responsive to a determination that the first signature does not match the second signature, a mismatch indication is returned in response to the request.

In some examples, the first signature can be computed prior to receipt of the request. The mismatch indication can be a first mismatch indication, and the following operations can also be performed. Responsive to the request being received, a first cardinality of the records in the first data block can be compared with a second cardinality of records in the second data block. Responsive to the comparing of the first and second cardinalities resulting in a mismatch, a mismatch indication can be returned in response to the request. The comparing the first signature with the second signature can be performed responsive to the comparing of the first and second cardinalities resulting in a match. In additional examples, the mismatch indication can include identifiers of all records of the first data block not matching corresponding records of the second data block.

In certain examples, the disclosed technologies can be embodied as a system having one or more hardware processors, with memory coupled thereto; a database environment storing a plurality of analogous datasets in respective segments; and a storage unit configured to store a respective signature of each of the analogous datasets. Each of the analogous datasets includes a plurality of records and each of the records has a plurality of fields. The system also includes computer-readable media storing instructions executable by the one or more hardware processors, including first, second, and third instructions. Upon execution, the first instructions compute the respective signature for one of the analogous datasets over a selected subset of the fields, and cause the respective signature to be stored in the storage unit. Upon execution, the second instructions parse a request received from a client, resulting in identification of (i) the analogous datasets and (ii) a requested operation to compare the analogous datasets. Upon execution, the third instructions compare the respective signatures of the analogous datasets and report, in response to the request, matching datasets and/or one or more distinct datasets among the analogous datasets.

In some examples, the request can specify a reference dataset among the analogous datasets. The comparing can be performed pairwise, each pair comprising (a) the reference dataset and (b) another dataset among the analogous datasets. The third instructions can report the matching datasets and the one or more distinct datasets. Each of the matching datasets can be a match to at least one other dataset among the analogous datasets. Each of the one or more distinct datasets can lack any match among the analogous datasets. In additional examples, the instructions can also include fourth instructions which, upon execution, determine whether the respective signature for a given dataset of the analogous datasets is absent from the storage unit. Responsive to determining absence, the absent respective signature can be computed. The database environment can incorporate a relational database.

In further examples, the selected subset of the fields can be a first subset of the fields. The storage unit can be configured to store, for a given dataset of the analogous datasets, corresponding signatures for multiple subsets of the fields. The second instructions can also parse the received request to identify a particular subset of the fields, among the multiple subsets of the fields, to be used for the requested operation. The third instructions can cause the analogous datasets to be compared using signatures, among the corresponding signatures, corresponding to the particular subset of the fields.

The foregoing and other objects, features, and advantages of the invention will become more apparent from the following detailed description, which proceeds with reference to the accompanying figures.

DETAILED DESCRIPTION

Introduction

Figure 1:
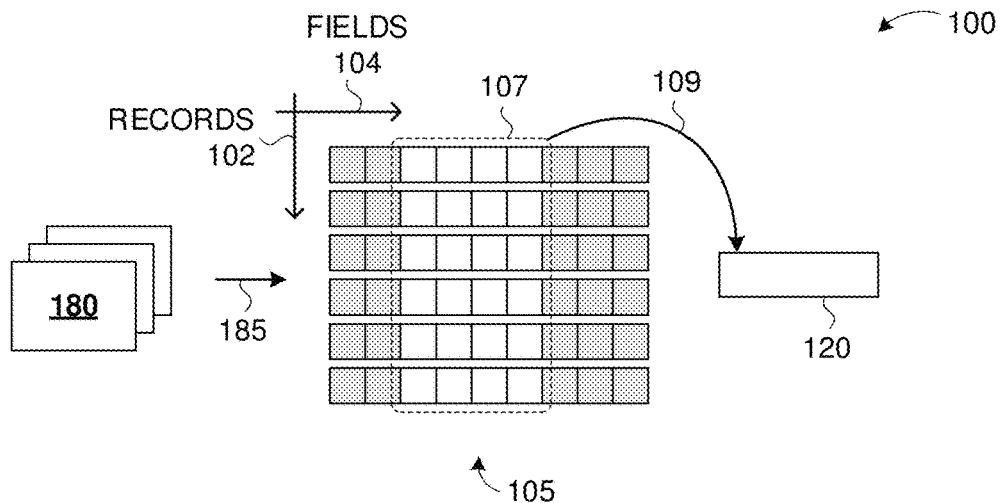
FIG. 1 is a diagram illustrating aspects of a first example implementation of the disclosed technologies.

Records of a dataset commonly contain fields with relevant content (e.g. significant fields), which could be an amount of some attribute, a name of another attribute, a link to a supporting data file or to images, and so forth. If two records are to be matched, it is desirable that some or all of these content fields are identical. However, a record can also commonly contain other fields which do not convey content relevant to a comparison operation. Such fields (e.g. deprecated fields) can include universally unique identifiers or sequence numbers, timestamps for creation or modification of the record, or a name of an associated user. These fields can be irrelevant to comparison of content between two records.

There are numerous scenarios where two versions of a dataset (e.g. analogous datasets) can be expected to have matching content, but for reason of retaining software flexibility, imposing strict copying among the datasets can be unsuitable. As one example, governmental regulations or industry practice can vary from one jurisdiction to another. So, fields of analogous datasets can have subtly different meaning in different instances, and the software application desirably retains the flexibility for particular fields (data values) of the different datasets to be different, although in most instances the analogous fields can and should be the same.

In modern database applications, datasets can be large-having hundreds, thousands, or millions of records, each with tens, hundreds, or thousands of fields-so that the total volume of data in one version of a dataset can be thousands, millions, billions, or even more individual data items. Moreover, the total number of dataset versions can also be large-spread over different divisions of a company, spread over different countries, or with snapshots taken at various times.

As a matter of maintaining consistency of data, or for performing database audits, it can often be desirable to verify that relevant content is matched across multiple versions of a dataset. Such verifications can be performed periodically, or can be initiated ad hoc by a user. But the presence of deprecated fields, together with large datasets or large numbers of versions, can present a significant technical challenge. Some tools include database reports which can be manually checked to confirm matches or identify mismatches, which can be very laborious despite a report itself being automatically generated. Other tools include comparison of datasets in their entirety, which do not distinguish deprecated fields from significant fields. Both these techniques can also perform poorly when faced with two datasets having matching records arranged in different order.

The disclosed technologies overcome all of these problems to provide efficient and robust comparison of large numbers of large datasets, with comparison limited to relevant content, and optionally insensitive to ordering of data records.

In examples of the disclosed technologies, a subset of fields (significant fields) can be selected from all available fields so as to distinguish relevant content from irrelevant data. In varying examples, the selected subset of fields can be predetermined in a configuration file, can be provided by a user via a user interface, or can be passed as a parameter of a client request.

One or more hash values can be computed over the selected subset of fields for multiple records in a dataset. A single hash value can be used as a signature of the dataset, or a signature can be derived from multiple hash values of the individual records. (Using e.g. an XOR function to combine the individual hash values, which can provide a signature that is insensitive to the order of the data records.) Signatures of two or more datasets can be compared to determine whether the relevant content of the datasets (in the selected subset of fields) is matching.

Because signatures are compact, comparison of signatures enables many pairwise comparisons of datasets to be made efficiently. Additionally, the compact signatures can be stored with minimal additional use of storage space, and can be retrieved on demand when needed over the lifetime of a dataset. These and other features of the disclosed technologies will become more apparent from the following description.

Methods and apparatus are disclosed for comparing relevant content of datasets. Hash values are computed over a selected subset of fields to obtain a signature of a dataset, with other fields being disregarded. A hash value can be computed for all records of the dataset, or individually for each record. Comparison of the signature with that of other datasets can lead to efficient determination whether two datasets match with respect to relevant content in the selected fields. For larger groups of datasets, lists of matched and mismatched datasets can be reported. Optional features include matches insensitive to permutation of the records, or identification of which records in one dataset fail to match corresponding records in another dataset.

These and other features of the disclosed technologies are brought out through examples described below.

Terminology

The usage and meaning of all quoted terms in this section applies throughout this disclosure unless clearly indicated otherwise or repugnant to the context. The terminology below extends to related word forms.

A "client" is a hardware or software computing entity that uses a resource provided by another hardware or software computing entity dubbed a "server."

The unqualified term "data" refers to any digital representation of information.

A "dataset" (also, "data block") is a data structure storing a finite collection of data items. Some datasets described herein are tables, but this is not a requirement, and hierarchical or other data structures can also be used. Two or more datasets which are sought to be tested for having a match condition are dubbed "analogous" datasets. That is, analogous datasets can have similar content, which can but need not be identical at least over a selected subset of fields.

A "database" (DB) is an organized collection of data maintained on computer-readable media and accessible by execution of instructions at one or more processors. Databases can be relational, in-memory or on disk, hierarchical or non-hierarchical, or any other type of database.

A "database environment" (alternatively, "database system" or "database instance") is a combination of one or more databases with additional software applications for handling queries, generating views, maintaining underlying data, comparing versions of data, or other functionality. A single database instance can be distributed across multiple server computers, although this is not a requirement.

A "field" is a value of a particular data item in a dataset. A field can be identified by a name of the data item or a position of the data item in the dataset. In a database table where multiple records occupy respective rows of the table and have the same organization, a field can be identified by the corresponding column, which is understood to apply to each row (record) of the table. In some examples, fields used for computing a signature of a dataset or comparing one dataset with another are dubbed "significant fields." Other fields not used for computing the signature or for comparing the dataset with another are dubbed "deprecated fields." Fields can be designated by specifying a column of a table, a position in a data structure, or a key in a collection of key-value pairs, with the understanding that the fields so designated include the corresponding fields having that column, position, or key for all records of an instant dataset.

A "hash function" is a function that converts inputs (dubbed "keys") of varying sizes to outputs having a fixed size in memory or a fixed number of bytes. The output can be a string, integer, or another binary value. The output of a hash function on a given key or keys is dubbed the "hash", "hash code", or "hash value" of the key(s). In some examples, any of the SHA family of hashing algorithms can be used as a hash function, but this is not a requirement, and parity functions, cyclic redundancy codes, or other functions can also be used. In some examples, the fixed size of a hash value can be dependent on a number of records in a dataset while, in other examples, the fixed output size of a hash function can be independent of the number of records in the dataset. A hash function can be stateless, such that multiple invocations of the hash function, on a given key, result in a same predictable hash value.

"JSON" is JavaScript Object Notation.

In the context of datasets, a "match" is a condition of two datasets having the same content in some selected subset of fields. In described examples, a match condition can be determined based on the two datasets having identical signatures. In varying examples, a match can be insensitive or sensitive to the order of data records within the datasets. A "mismatch" is a condition of the two datasets not having a match, i.e. differing in some content of one or more significant fields. A match is not absolute, and can depend on which subset of fields is selected, or on whether the comparison is order-sensitive. Accordingly, two datasets can be matched according to one criterion but can be mismatched according to another criterion.

The term "parse" refers to an operation of traversing a request or other message to extract parameters contained therein.

The terms "receive" and "transmit" refer to communication over a network, which can be in the form of a message. The communication can be electromagnetic, e.g. over wired, wireless, or optical media, but this is not a requirement.

The term "record" refers to a collection of multiple data fields having respective values, and is used in different contexts. In the context of a database, a record can be a row of a database table, with the fields of the record containing respective values for the columns of the database table. In the context of other data structures, a record can be one unit among multiple units of a data structure, the units (records) sharing a common specification for their fields, but having possibly different values for one or more of the fields.

A "report" is a message containing one or more results of an operation. In some described examples, a report can contain an indication of whether two or more datasets are matched or mismatched. Among three or more datasets, a report can list which datasets are matched (optionally, in distinct groups of matching datasets) or which datasets are not matched.

A "request" is a message to which a substantive response ("response") is expected, that is, a response beyond an acknowledgment. A request can also be a message for which a recipient of the message is expected to take a specified action. In contrast, a "notification" need not receive a substantive response, nor result in any specific action.

A "signature" of a dataset is a value computed from the dataset according to a deterministic procedure. A signature can be a hash value and can be significantly smaller in size than the underlying dataset, however neither of these are requirements. Hash values computed on portions (e.g. selected fields) of the dataset can be combined with each other or with other data items to form a signature. Some signatures can be a predetermined size, and can in principle be computed on a portion of dataset having a size smaller than the predetermined size. Multiple deterministic procedures can be used to calculate distinct respective signatures of a dataset (e.g. using different respective subsets of fields).

A "server" is a computing system, implemented as hardware on which software is executed, providing one or more services or access to one or more resources for at least one client, and often for a plurality of clients. In this disclosure, servers can host software applications that read, write, modify, or compare datasets, or can provide other functions.

"Software" refers to computer-executable programs or instructions and associated data structures. Software can be in active or quiescent states. In an active state, software can be loaded into memory, or can be undergoing execution by one or more processors. In a quiescent state, software can be stored on computer-readable media, awaiting transmission or execution.

A "subset" is a portion of a group ("set") of items having at least one of the items, but less than the entire group of items. As used herein, the term subset excludes the null set and excludes the parent set itself. In some disclosed examples, a hash value can be calculated over a subset of fields of a dataset or of a data record. To illustrate, the data record or data block could have 100 fields, and the hash value could be calculated over a subset of 1-99 of these fields.

A "table" is a two-dimensional array organized into rows (e.g. records) and columns (e.g. corresponding fields among the records). A table can be a database table, or a tabular array of fields. Commonly, a row can be a record pertaining to an instance of some class of objects represented in the table, and a column can pertain to a particular property of those objects. A field at the k-th column of the m-th row can be a value of the k-th property for the m-th object. However, while such table organization can be useful for illustration, it is not a requirement of the disclosed technologies, and other organizations and representations can be used, both for databases and for other tables. A database table can have relational links, such as shared columns, with other tables. In examples, a database table can be a row store table accessed through an associated index structure, or a column store table.

A "token" is an atomic component of a body of text such as a JSON document. Commonly, a token can be a word, a number, or other string having a semantic meaning not present in a subset of the string.

Example Hash Codes and Signatures

Figure 2:
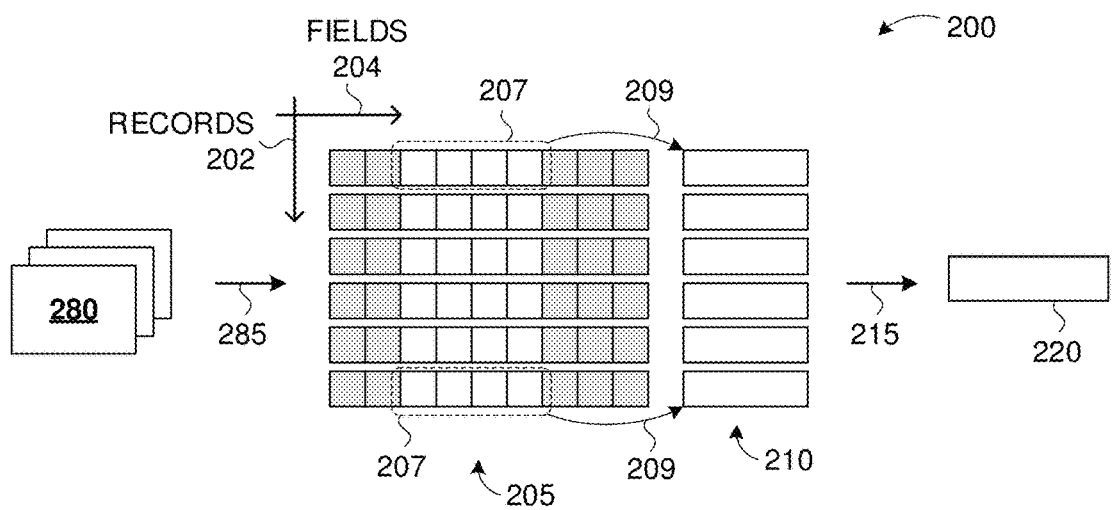
FIG. 2 is a diagram illustrating aspects of a second example implementation of the disclosed technologies.
Figure 3:
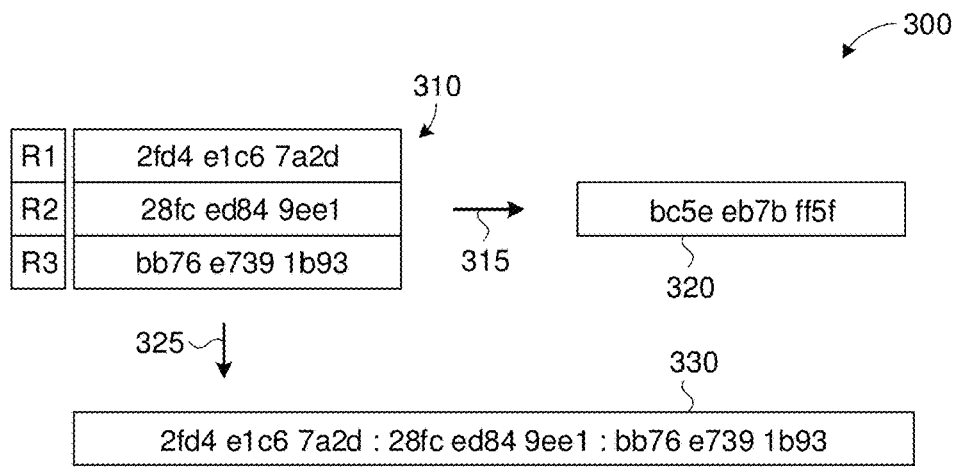
FIG. 3 is a diagram illustrating example signatures of a dataset according to the disclosed technologies.

Some embodiments of the disclosed technologies involve hash codes or signatures computed over a selected subset of fields of a data block. FIGS. 1-3 depict some exemplary implementations.

FIG. 1 is a diagram 100 illustrating aspects of a first example implementation of the disclosed technologies. FIG. 1 depicts a table 105 having multiple records arranged vertically one below the other as indicated by arrow 102, with each record having fields arranged from left to right as indicated by arrow 104. For convenience of illustration, illustrated table 105 has six records with nine fields each. However, the disclosed technologies can be applied to tables of any size. Certain columns of like fields are shaded gray to denote that these fields can be disregarded for purposed of comparison of table 105 with other data tables. Other fields are unshaded indicating that they are to be considered while comparing table 105 with other data tables. Dotted line 107 indicates all selected fields of table 105. For convenience of illustration, the selected fields of table 105 are shown as contiguous columns, but this is not a requirement. To illustrate with another example, the selected fields could be in columns 1, 4, 5, 7, or any other subset of columns.

As illustrated by arrow 109, a hash function can be applied to the selected fields 107 of all records to obtain a hash value 120 of table 105. That is, hash value 105 can be computed over all selected fields 107 and can disregard all the shaded fields. Hash value 120 can be used as a signature of table 105, to be compared with counterpart signatures of other data tables.

Also shown in FIG. 1 are one or more data structures 180, which can be tables of a database environment such as a relational database environment, or other data structures. Table 105 can be derived from the data structures (e.g. tables) 180 as indicated by arrow 185. In some examples, table 105 can be all or part of one table 180. In other examples, table 105 can be derived as a view from one or more underlying data structures 180.

FIG. 2 is a diagram 200 illustrating aspects of a second example implementation of the disclosed technologies. Like FIG. 1, FIG. 2 depicts an illustrative table 205 having six records arranged vertically (per arrow 202), with nine fields arranged horizontally (per arrow 204) in each record. Table 205 can be derived from one or more database tables 280 as indicated by arrow 285.

Unlike FIG. 1, individual hash values 210 are computed in FIG. 2 over the selected fields 207 of each respective record, as indicated by arrows 209. An overall signature 220 for table 205 can then be computed from the individual hash values 210 as indicated by arrow 215. Whereas signature 120 can be directly computed from fields 107, signature 220 can be indirectly computed from fields 207, via intermediate hash values 210. In some examples, indirectly computed signature 220 can itself be a hash value.

A variety of techniques can be used to combine individual hash values 210 into signature 220. FIG. 3 is a diagram 300 illustrating two such methods. Structure 310 shows three representative hash values computed for respective records denoted R1, R2, R3. As disclosed herein, each of the hash values in table 310 can be computed over selected fields of the records, while disregarding other fields.

Arrow 315 indicates an operation that takes a bitwise exclusive-or ("XOR") of the hash values 310 to obtain a single hash value 320 which can be used as a signature of an underlying data table. Applied to more than two inputs, a bitwise XOR results in a 1 at a given bit position if an odd number of inputs have a 1 at that bit position, and results in a 0 if an even number of inputs have a 1. To illustrate, the two most significant bits of hash values 310 are "00" (from R1: 2FD4, which is 0010 1111 1101 0100 in binary notation), "00" (from R2: 28FC, which is 0010 1000 1111 1100 in binary notation), and "10" (from R3: BB76, which is 1011 1011 0111 0110 in binary notation). Accordingly, the most significant bit position has one "1", which is odd, so the most significant bit of output 320 is a "1". The next most significant bit position has zero 1's, which is even, leading to a "0". These values are reflected in the output signature 320 which begins BC5E. An advantage of the XOR combination function 315 is that the resulting signature 320 can be independent of the order of records R1, R2, R3 in table 310, which allows comparison of the underlying datasets to be insensitive to permutations among their records. Another advantage of the XOR combination function is that it can be easily maintained as records are added or deleted, or by suitable XOR operations between signature 320 and appropriate individual hash values.

In other examples, it can be desirable to have a signature that is sensitive to order of the records, so that a match between datasets verifies that the datasets have same relevant content and same record order. In such examples, a different combination function 315 can be used. As one illustration, the hash values 310 of records R1, R2, R3 can be rotated right 0, 1, and 2 bit positions respectively and then added or XOR'ed together to obtain an order-sensitive signature 320. As another illustration, the hash values 310 can be serialized and hashed using SHA-n or another hashing function.

Arrow 325 indicates an operation that concatenates the individual hash values 310 to obtain a signature 330 which can be used as a signature of an underlying data table. An advantage of the concatenation function 325 is that mismatches can easily be traced to specific mismatched records of underlying data tables. Two records whose hash values match can be XOR-ed to obtain a string of 0's, while XOR of mismatched hash values will have at least one "1" and typically several 1's. To illustrate, if XOR of signature 330 with a corresponding signature of another dataset results in "0000 0000 0000:0100 1100 0111:0000 0000 0000" then it can be readily determined that records R1 and R3 match across the two datasets but record R2 does not. Another advantage of the concatenation function is that it can be easily maintained as records are added, deleted, modified or reordered, by adding, removing, replacing, or reordering portions of signature 330.

While a concatenated signature 330 can be advantageously employed when the number of records is relatively small (e.g. less than or equal to 100), in other examples it can be desirable to have a signature that has a fixed or bounded size regardless of the number of records in an instant dataset. To illustrate, concatenation 330 can itself be hashed to obtain a shorter hash value. Other techniques can also be used to combine the individual hash values of respective records.

1. Selection of Fields

Fields can be selected in various ways, for selected fields 107, 207, and also in context of other examples described herein, e.g. in context of FIGS. 4-13. In some examples, selected fields can be designated by specification of database columns (or associated columns, positions, keys, etc.) in a configuration file or in metadata of a database environment. In other examples, selected fields can be user selected from a graphical user interface (GUI), e.g. using a drop-down menu. In further examples, selected fields can be specified indirectly by designation of deprecated fields (or associated columns, positions, keys, etc.). Still further, selected fields can be provided or indicated in a request to compare two or more datasets.

First Example Data Flow Diagram

Figure 4:
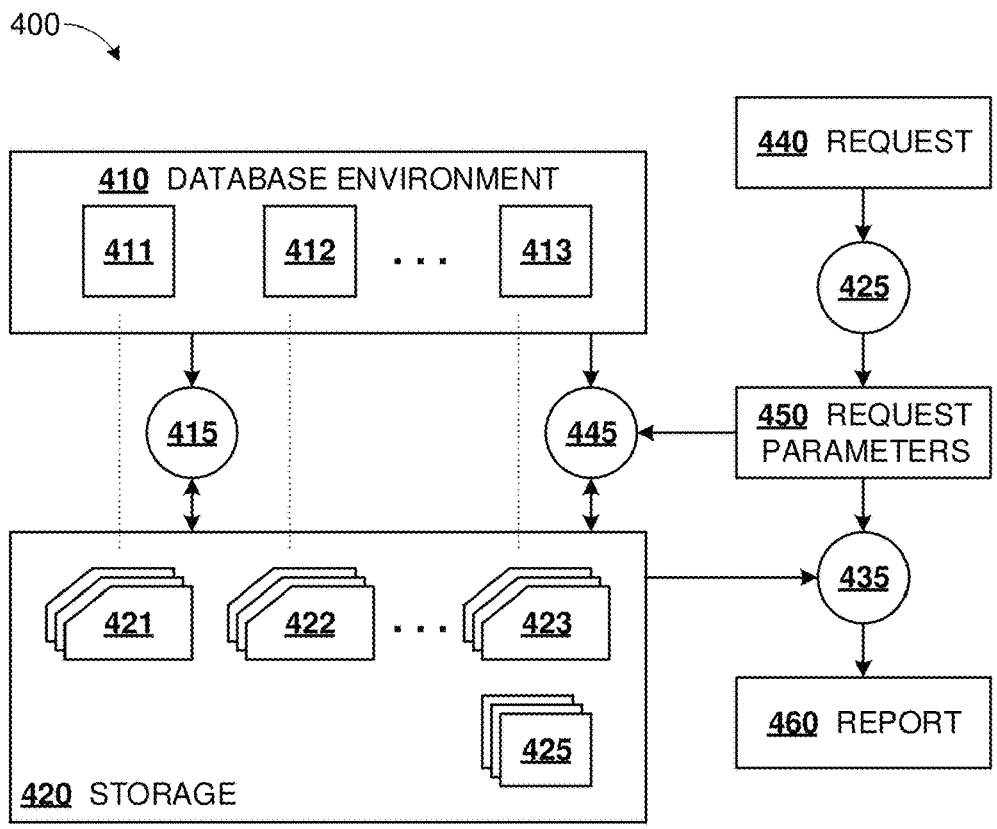
FIG. 4 is a first data flow diagram for comparing datasets according to an example of the disclosed technologies.

FIG. 4 is a first data flow diagram 400 for comparing datasets according to an example of the disclosed technologies. Diagram 400 proceeds from multiple datasets 411-413 and a request 440 to compare some among these datasets to a report 460 providing results. In diagram 400, data objects or collections of data are shown in rectangles, while operations on data are shown as circles.

Datasets 411-413 can be present in or extracted from one or more database environments 410. Process block 415 can operate on each of datasets 411-413 to compute respective signatures 421-423 and can cause computed signatures 421-423 to be stored on storage 420. Each signature is computed over a selected or specified subset of fields 425, while disregarding other fields of datasets 411-413. In some examples, multiple field selections 425 can be present, e.g. for different use cases, and accordingly, each dataset 411 can have multiple signatures 421, one signature for each respective selection or specification of fields 425.

Request 440 can be a request to compare two or more datasets 411-413. Process block 425 can parse request 440 to identify (i) some among datasets 411-413, as well as (ii) a requested operation to compare the identified datasets 411-413. The dataset identifiers and the indication of the requested operation can be part or all of request parameters 450. In some examples, request parameters 450 can also specify a list of fields to be retained in the comparison. In further examples, request parameters 450 can include a designation of one of the datasets 411-413 as a reference dataset.

Request parameters 450 and signatures 421-423 can be input to process block 435, which can compare the signatures 421-425 of the identified datasets 411-413 and can output a report 460 indicating results of the comparison. To illustrate, if datasets 411, 412, 413 are identified in the request, one possible report could indicate that datasets 411, 413 match (over a selected subset of fields) and could further indicate that dataset 412 is distinct, not matching any of the other compared subsets (over the selected subset of fields).

Numerous variations of the illustrated data flow can be implemented within the scope of the disclosed technologies. As an example, where the request parameters include a reference dataset, the comparisons at block 435 can be a series of pairwise comparisons between (a) the reference dataset, and (b) each of the other datasets identified in request 440. That is, every pairwise comparison can include the reference dataset. Thereby, if dataset 411 is specified as the reference dataset, no comparison between datasets 412, 413 is made to see if they match each other. In further examples, where multiple subsets of fields 425 are present and, accordingly, each dataset 411 has multiple signatures 421, request 440 can include a specification of which subset of fields to use for comparison. An identification of this subset of fields can be extracted by block 425 through parsing of request 440, and the signatures 421-423 corresponding to this subset of fields can be used for comparison by block 435.

In additional examples, process block 445 can receive the request parameters as input and, if a signature required for a requested comparison is absent from storage 420, then block 445 can also compute the absent signature and cause it to be stored on the storage unit 420.

In examples, any one or more of the process blocks 415, 425, 435, 445 of FIG. 4 can be performed by one or more hardware processors executing instructions stored on computer readable media. Storage 420 can be a solid-state storage unit (e.g. utilizing flash memory technology) or magnetic storage unit (e.g. a disk drive). Database environment 410 can include a relational database.

Second Example Data Flow Diagram

Figure 5:
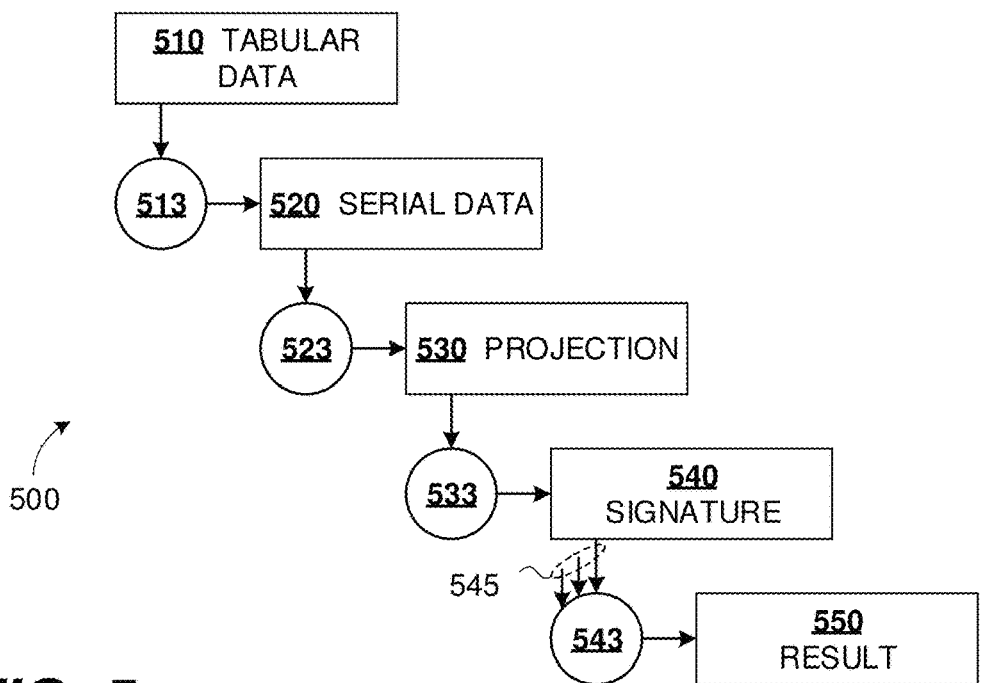
FIG. 5 is a second data flow diagram for comparing datasets according to an example of the disclosed technologies.

FIG. 5 is a second data flow diagram 500 for comparing datasets according to an example of the disclosed technologies. Diagram 500 proceeds from input tabular data to an output result. In this data flow, the tabular data is serialized and a signature is computed on a projection of the serialized data. Comparison of signatures leads to the result as to datasets being matching or distinct.

Tabular data 510 can be a database table, a view generated from a database environment, or another data structure. Tabular data 510 can be one version of underlying data content, for which it is desired to compare selected significant fields with another version of similar or same underlying data content. Tabular data 510 can be operated on by process block 513 to obtain serial data 520. Serialized data 520 can be operated on by process block 523 to obtain a projection 530 of the data. In some examples, projection 530 can retain significant fields and can discard deprecated fields. With reference to tables 105, 205 of FIGS. 1-2, block 523 can project the 9 fields of each record (which can be regarded as 9 dimensions) onto the 4 unshaded (significant) fields, with the 5 shaded (deprecated) fields being discarded. In some examples, the serial data 520 or the projection 530 of the serial data can be stored, manipulated, or transmitted in JSON format. The projected data 530 can be operated on at block 533 to obtain a signature of the projected data, which is also a signature of the original tabular data. In some examples, as described herein e.g. in context of FIG. 1, the signature can be a hash value of the projected data 530. In other examples, as described herein e.g. in context of FIG. 2, block 533 can first compute individual hash values of the projection of each record or row of tabular data 510, and then combine the individual hash values to obtain signature 540, as described in context of FIG. 3. Additional signatures of additional versions of similar or same underlying data can be similarly derived. Arrows 545 represent two or more signatures being input to process block 543, where the signatures can be compared to determine a result which can include matches or mismatches among the versions of tabular data, or versions that may not have any match among the versions compared at block 543.

Numerous variations of the illustrated data flow can be implemented within the scope of the disclosed technologies. For example, process block 523 can have another input as a list of field identifiers to be retained within projection 530. The list of field identifiers can be obtained from a client request via a user interface or application programming interface (API), or can be obtained from a predefined configuration file. Other serialization formats can be used as alternatives to JSON. A non-exhaustive list includes ASN.1, CSV, Fast Infoset, Ion, Pickle, SOAP, XDR, XML, YAML, or variants thereof, as well as variants of JSON.

Third Example Data Flow Diagram

Figure 6:
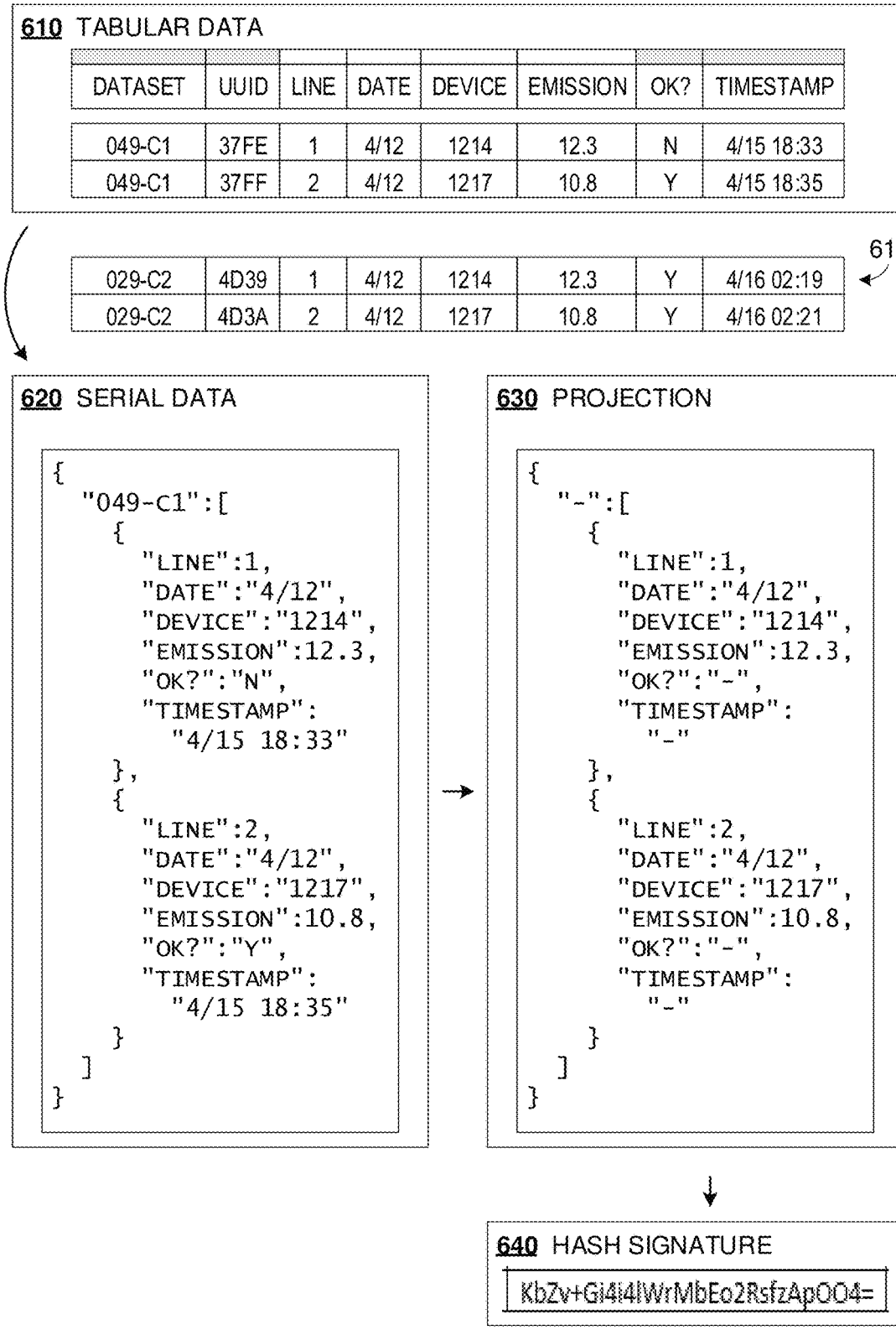
FIG. 6 is a third data flow diagram illustrating an example of the disclosed technologies.

FIG. 6 is a third data flow diagram 600 illustrating an example of the disclosed technologies. Tabular data 610 is a dataset of automobile emission data for a German automobile manufacturer. The first column of table 610 identifies the dataset as belonging to the German office (049-C1). Tabular data 612 shows the corresponding dataset for the manufacturer's U.S. office in another country (029-C2). The remaining columns of the datasets are as follows. Each row has a universally unique identifier (UUID), a local line number (LINE), a date associated with the data (DATE, e.g. a date on which the emission data was collected), the emission value (EMISSION), a Pass/Fail indicator (OK?), and a timestamp for the instant database entry (TIMESTAMP). For clarity of illustration, some columns of fields are shown with a shaded box above: these correspond to deprecated fields. The remaining fields can be regarded as containing relevant data for comparing the German and Peruvian datasets. For example, the UUID and TIMESTAMP fields are unique to the given row and are expected to differ between datasets 610, 612. Similarly, the DATASET is specific to the particular country office to which it belongs, and is expected to differ between datasets 610, 612. Finally, the pass/fail indicator (OK?) can be relative to particular emissions requirement of a given country, which can vary from country to country, hence in this example the OK? column can be disregarded for purpose of comparison.

Serial data 620 shows the data of table 610 after serialization (similar to block 513 of FIG. 5), in a JSON format. In this example, all fields of tabular data 610 are retained in serial data 620. Projection 630 shows the result of applying projection (similar to block 523) to serial data 620. The JSON format is retained, however the deprecated fields for DATASET, UUID, OK?, and TIMESTAMP columns have been replaced by null values "-". Finally, hash signature 640 can be computed from the projected data 630. Hash signature 640 is shown in base-64 encoding, however this is not a requirement.

As illustrated, the significant fields of data table 612 match those of table 610, and applying the same data flow to table 612 can result in the identical signature as hash signature 640 shown. Accordingly, intermediate data similar to 620, 630 are not shown for table 612.

First Example Method, Variations, and Extensions

Figure 7:
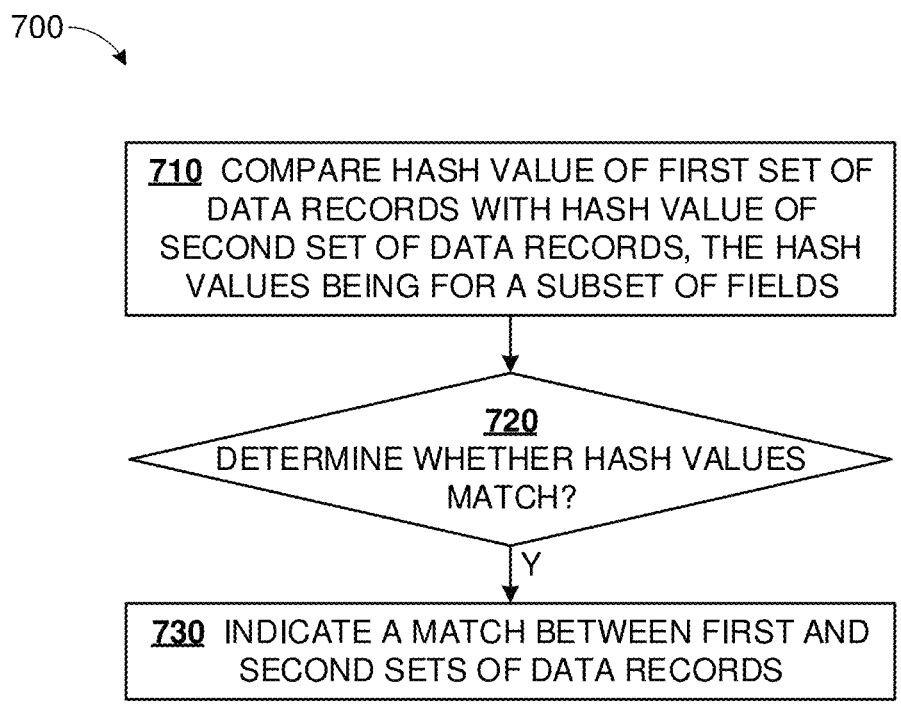
FIG. 7 is a flowchart of a first method for comparing two sets of data records according to an example of the disclosed technologies.
Figure 8:
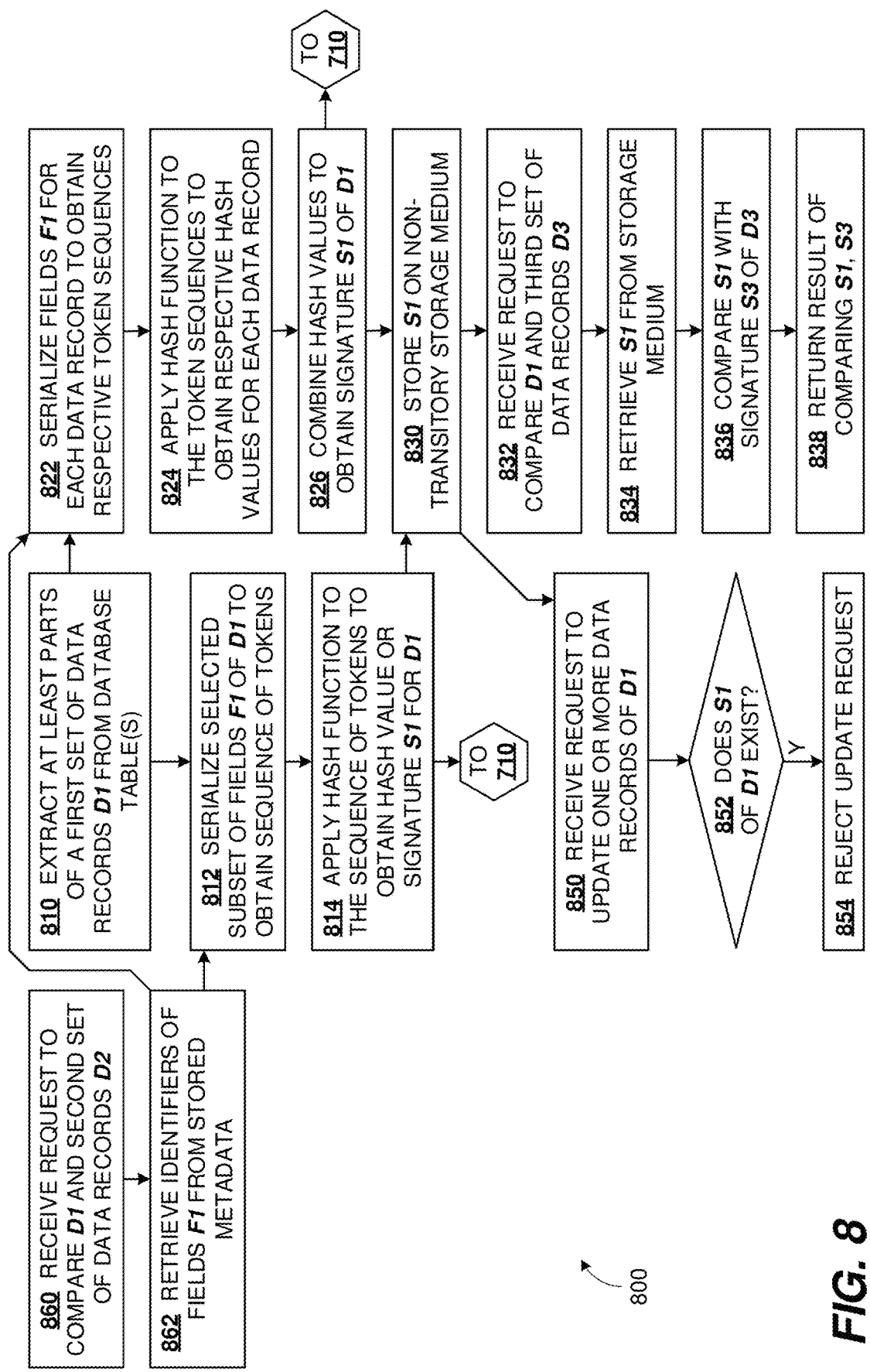
FIG. 8 is a flowchart depicting example variations and extensions of the first method according to the disclosed technologies.

FIG. 7 is a flowchart 700 for a first method of comparing two sets of data records according to an example of the disclosed technologies. Hash values for a selected subset of fields are compared, and a match is reported if the hash values match. Each set of data records can be a plurality of two or more data records.

At process block 710, a first hash value of a selected subset of fields of a first set of data records can be compared with a corresponding hash value of the selected subset of fields of a second set of data records. Then, at decision block 720, a determination can be made whether the compared hash value of the first set of data records matches the corresponding hash value of the second set of data records. Responsive to a determination that the compared hash values do match, the method can follow the Y branch from decision block 720 to block 730, where a match can be indicated.

Numerous variations and extension of this method can be implemented within the scope of the disclosed technologies. Some of these variations and extensions are depicted in flowchart 800 of FIG. 8. In some examples, the first hash value can be the direct result of applying a single hash function to a collection of all fields of the selected subset of fields over all data records of the first set of data records, similar to the implementation of FIG. 1. A single application of a hash function can be more efficient than piecewise computation of e.g. individual hash functions for each record, particularly when the number of records is large. In certain of these examples, process blocks 810, 812, 814 can be performed prior to block 710. At block 810, at least parts of the first set of data records D1 can be extracted from one or more data tables (e.g. similar to tables 180 of FIG. 1). At block 812, the selected subset of fields F1 can be serialized to obtain a sequence of tokens. At block 814, a single hash function can be applied to the sequence of tokens to directly obtain the single hash value (120). The sequence of tokens can be in JSON format, similar to that depicted at 620, 630 of FIG. 6. The method can proceed from block 814 to block 710.

In other examples, the first hash values can be computed from a plurality of individual hash values (intermediate hash values) for respective data records of the first set of data records. Each of the individual hash values can be computed over all fields of the selected subset of fields, for the respective data record, similar to hash values 210 of FIG. 2. In certain of these examples, process blocks 810, 822, 824, 826 can be performed prior to block 710. At block 810, at least parts of the first set of data records D1 can be extracted from one or more data tables (e.g. similar to tables 280 of FIG. 2). Proceeding to block 822, the selected fields for each data record (207) can be serialized to obtain respective token sequences. At block 824, a hash function can be applied to each token sequence to obtain respective hash values (210) for each data record, and at block 826, the intermediate hash values can be combined to obtain signature S1 (220) of the first dataset D1. The method can proceed from block 826 to block 710, where signature S1 computed at block 826 can be the hash value of the first dataset used at block 710.

In further examples, the signature S1 can be stored on a non-transitory storage medium at block 830. (In other examples, signature S1 can be stored following block 814, wherein the signature can be similar to 120 of FIG. 1.) Subsequently, at block 832, a request from a client can be received to compare the first set of data records D1 and a third set of data records D3. At block 834, signature S1 can be retrieved from the non-volatile storage medium, and at block 836 the signature S1 can be compared with a signature S3 of the third set of data records D3. Finally, at block 838, a result from block 836 can be returned to the requesting client.

Turning back to block 826, in some examples the signature (220) derived from individual hash values (210) can be independent of the order of the data records in the first set, similar to that described in context of signature 320 of FIG. 3.

In additional examples, the method of FIG. 7 can be preceded by one or more of blocks 860, 862. At process block 860, a request can be received from a client to compare the first and second sets of data records D1, D2. The request can designate, singly or collectively, the subset of fields F1 to be used for hash value computation. At block 862, identifiers of the selected subset of fields F1 can be retrieved from stored metadata. In varying examples, these identifiers can be used to extract the selected fields during serialization of fields at blocks 812 or 822.

In further examples, updates to a set of data records can be prohibited after its signature has been stored. Thus, following storage of signature S1 at block 830, the method can proceed to block 850, where a request is received to update one or more records of the first set of data records D1. At decision block 852, a determination can be made whether the signature S1 of D1 exists, e.g. is stored on the non-transitory storage medium. If the signature exists or is stored on the non-transitory storage medium, the method can follow the Y branch from block 852 to block 854, where the update request can be rejected.

Second Example Method

Figure 9:
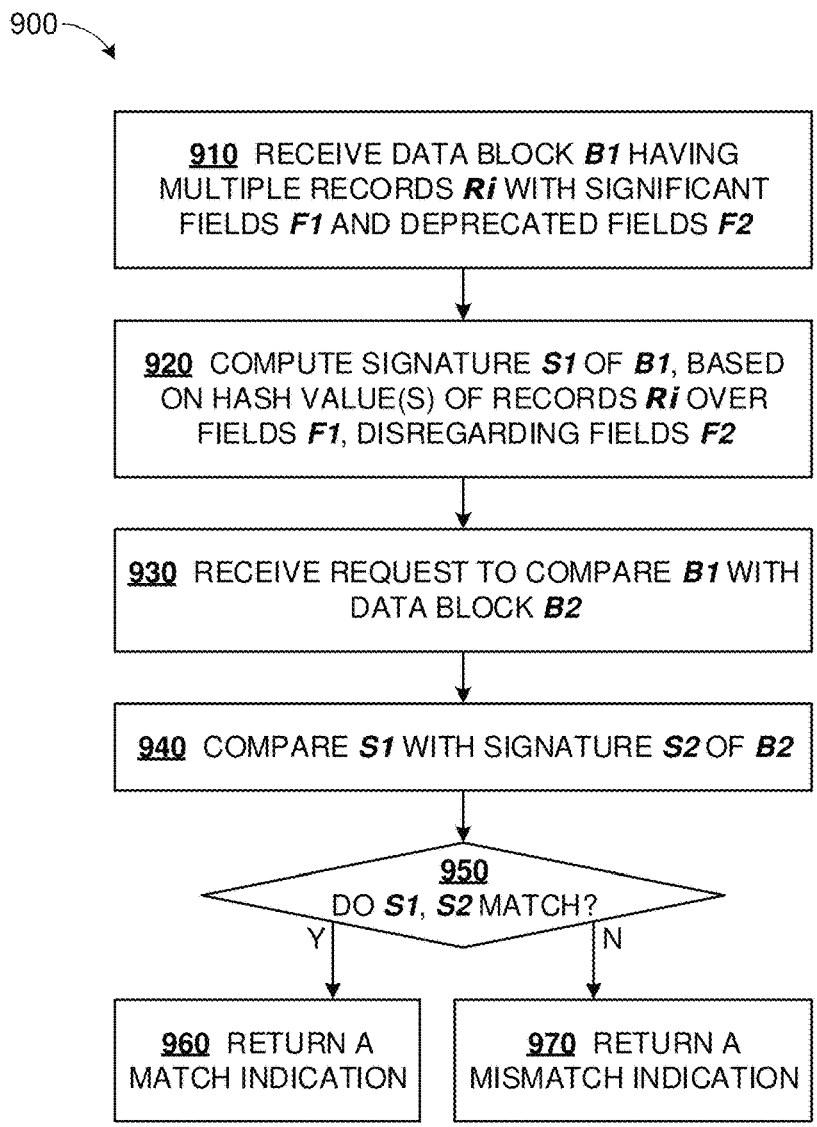
FIG. 9 is a flowchart of a second method for comparing two data blocks according to an example of the disclosed technologies.

FIG. 9 is a flowchart 900 of a second method for comparing two data blocks according to an example of the disclosed technologies. In this method, a signature of a data block is computed. Responsive to a request, the signature is compared with another signature of another data block, and an indicator of a match or mismatch is returned.

At process block 910, a data block B1 having multiple records Ri can be received. Each record Ri can have multiple significant fields F1 and, complementary to the significant fields F1, one or more deprecated fields F2. At block 920, a signature S1 of data block B1 is computed, based on one or more hash values computed for all the records Ri over the significant fields F1, and disregarding the deprecated fields F2. With references to FIGS. 1-2, the significant fields F1 can be similar to the unshaded fields 107, 207 of tables 105, 205, while the deprecated fields F2 can be similar to the shaded fields of tables 105, 205. Signature S1 can be similar to signatures 120 or 220.

At block 930, a request can be received to compare data block B1 with another data block B2. At block 940, signature S1 of data block B1 can be compared with a signature S2 of data block B2, and at decision block 950, a determination can be made whether the signatures S1, S2 match. In a case of affirmative determination, the method can follow the Y branch from block 950 to block 960, where an indication of a match between data blocks B1, B2 can be returned in response to the request. Alternatively, in a case of a negative determination, the method can follow the N branch from block 950 to block 970, where an indication of a mismatch between data blocks B1, B2 can be returned in response to the request.

Numerous variations and extension of this method can be implemented within the scope of the disclosed technologies. In some examples, the signature computation at block 920 can precede receipt of the request at block 930, while in other examples the signature computation can be performed on-demand, or using lazy execution, only after an initial request is received at block 930. In varying examples, signature S2 of data block B2 can be retrieved from storage responsive to the request, can be provided along with or embedded in the request, or can be computed subsequent to receipt of the request.

In some examples, signature S1 can include individual hash values for respective records Ri, signature S2 can be similarly organized, and the comparison at block 940 can be performed by iteratively comparing the individual hash values in S1 with corresponding hash values (of individual records) in S2. In further examples, the mismatch indication returned at block 970 can include a list of one or more among the records Ri of data block B1 whose individual hash values in signature S1 failed to match corresponding hash values in signature S2. To illustrate, signatures S1, S2 can be similar to signature 330 of FIG. 3, and the mismatch list can be obtained in a manner described herein in context of signature 330.

Figure 10:
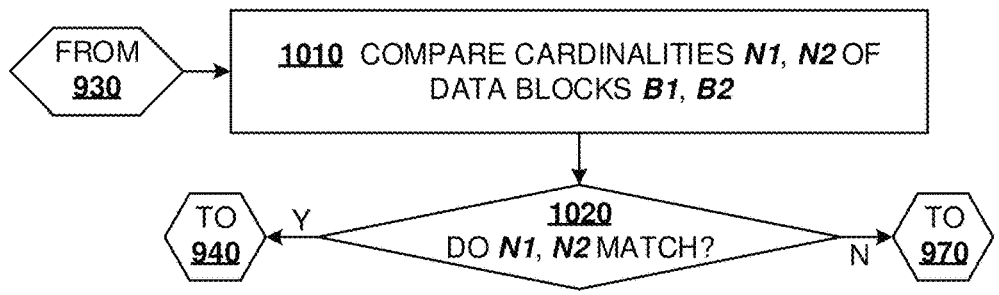
FIG. 10 is a flowchart illustrating an example extension of the second method according to the disclosed technologies.

Another extension is depicted in flowchart 1000 of FIG. 10. Block 1010 can be executed after block 930, and can compare respective cardinalities N1, N2 of data blocks B1, B2. At decision block 1020, a determination can be made whether the cardinalities N1, N2 match. To illustrate, a data block B1 having 2853 records Ri could have cardinality N1=2853. In case of a cardinality match (i.e. N1=N2), the method can follow the Y branch from block 1020 to block 940 for comparison of signatures. In case of a cardinality mismatch (i.e. N1 #N2), the method can follow the N branch from block 1020 to block 970 for return of a mismatch indication. Thus, a computational burden of comparing signatures (and optionally computing one or more signatures that have not already been computed) can be avoided if the data blocks B1, B2 are known to have different cardinality. In some examples where the signatures are concatenated hash values (similar to 330), a comparison of cardinality can be made by comparing lengths of the signatures S1, S2.

Third Example Method

Figure 11:
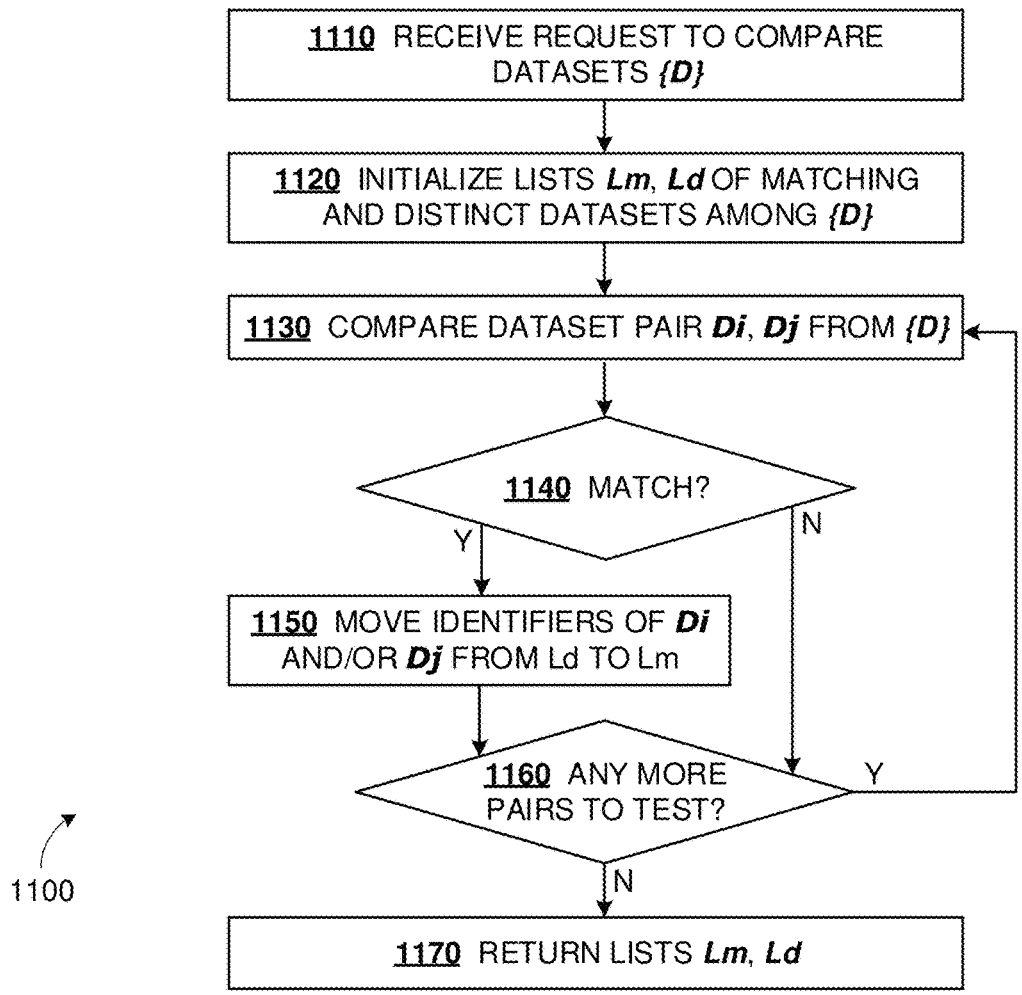
FIG. 11 is a flowchart of a third method for comparing datasets according to an example of the disclosed technologies.

FIG. 11 is a flowchart 1100 of a third method for comparing datasets according to an example of the disclosed technologies. In this method, lists of matching and distinct datasets are determined through successive comparisons of signatures. Features of this method can be applied to identify multiple groups of matching datasets.

At process block 1110, a request can be received to compare a set {D} of datasets and, at block 1120, lists Lm and Ld for matching and distinct datasets can be initialized. Blocks 1130-1160 perform iterative comparisons over pairs of datasets among {D}, updating the lists Lm, Ld based on the pairwise comparison results.

At block 1130, a pair of datasets Di, Dj is selected from {D} and compared. Comparison of two datasets can be performed by comparing signatures including one or more hash values computed over a selected subset of fields of the datasets. In some examples, the signatures can be precomputed while, in other examples, signatures can be computed as needed. Any of the techniques described herein, e.g. in context of FIGS. 1-3 can be used to compute a signature of a dataset.

At decision block 1140, a determination can be made whether the signatures (and hence the datasets Di, Dj) match. If a match is found, the method can follow the Y branch from block 1140 to block 1150 where one or both of Di, Dj can be moved from Ld to Lm. If both Di, Dj were in Ld, then both can be moved to Lm. If one of Di, Dj was already in Lm, then the other can be moved to Lm. If Lm contains multiple groups of matching datasets (which match within a given group, but are mismatched between groups), then matching Di, Dj can be retained in a same group within Lm. After updating Ld, Lm, the method can proceed from block 1150 to block 1160.

However, if Di, Dj are found not to match (i.e. their signatures are different) at decision block 1140, then the method can proceed via the N branch from block 1140 to block 1160. At block 1160, a determination can be made whether any pairs of datasets in {D} remain to be tested. If yes, then the method can follow the Y branch from decision block 1160 back to block 1130 for comparison of another pair of datasets. If no further pairs need be compared, then the method can proceed via the N branch from block 1160 to block 1170, where the lists Lm, Ld can be returned in response to the request of block 1110.

In some examples, the pairwise comparisons can be restricted to comparisons against a specified reference ("golden") dataset. Thus, in a group {D} of 10 datasets, nine comparisons can be made: D1×D10, D2×D10, . . . . D9×D10. In other examples, the pairwise comparison can test all pairwise combinations among {D}. To illustrate, if {D} contains N datasets, then up to N(N−1)/2 comparisons can be made, e.g. 45 comparisons for N=10 datasets. Of course, once two datasets Da, Db have been found to match, a subsequent dataset Dc can be compared against just one of Da or Db. That is both combinations Dc×Da and Dc×Db can be tested by a single comparison Dc×Da.

1. Lists of Matching or Distinct Datasets

Figure 12:
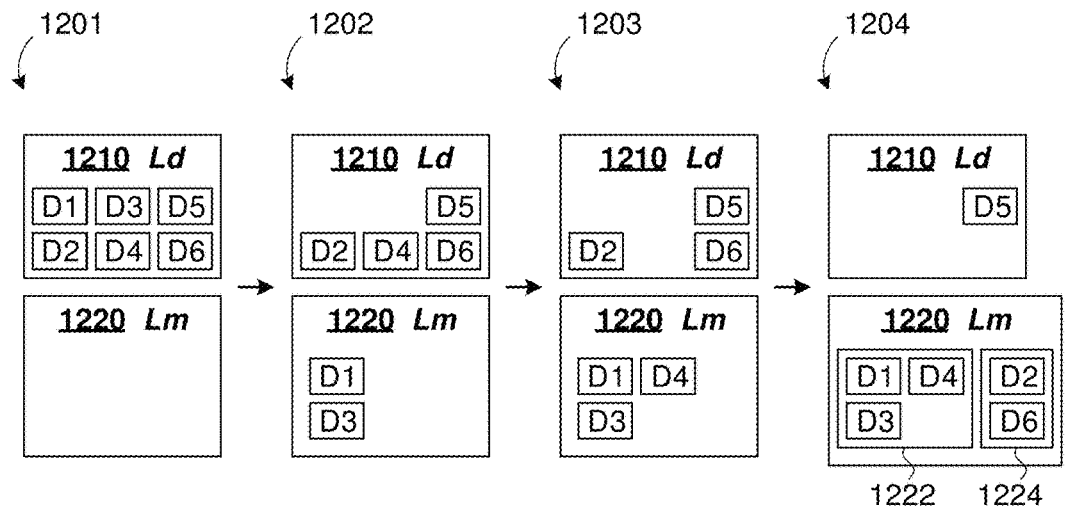
FIG. 12 is a series of diagram illustrating evolution of the third method in an example of the disclosed technologies.

FIG. 12 is a series of diagrams 1201-1204 illustrating the evolution of lists Ld 1210 and Lm 1220 in an example with six datasets {D} denoted D1-D6. At block 1120, list Ld 1210 can be initialized to contain identifiers of all datasets D1-D6, as shown in diagram 1201, while list Lm 1220 can be initialized to be empty. A first round of iterations of loop 1130-1160 can be performed between D1 and, successively, D2-D6. In this illustration, a match between D1, D3 can be determined at block 1140, and at block 1150, identifiers of matching datasets D1, D3 can be moved from Ld 1210 to Lm 1220 as shown in diagram 1202. On a next iteration, D1 and D4 can also be found to match at block 1140, resulting in a move of D4's identifier from Ld 1210 to Lm 1220 at block 1150, as shown in diagram 1203. In this illustration, no other matches are found in the first round of iterations, which completes with identifiers of D2, D5, D6 remaining in Ld 1210. A second round of iterations among these remaining datasets can find a match between D2 and D6 (but no match between D2 and D5). Accordingly, identifiers of D2 and D6 can be moved from Ld 1210 to Lm 1220 as shown in diagram 1204. Because D2, D6 do not match D1, a first group of matching datasets 1222 can be formed with identifiers of D1, D3, D4 and a new group 1224 can be formed to contain identifiers of D2, D6. Because no more pairwise combinations remain to be tested, at block 1170 the method can respond to a comparison request by returning lists Ld 1210 (having just a single identifier of D5) and Lm 1220 (having two groups of matching datasets) as shown in diagram 1204.

2. Table of Pairwise Dataset Comparisons

Figure 13:
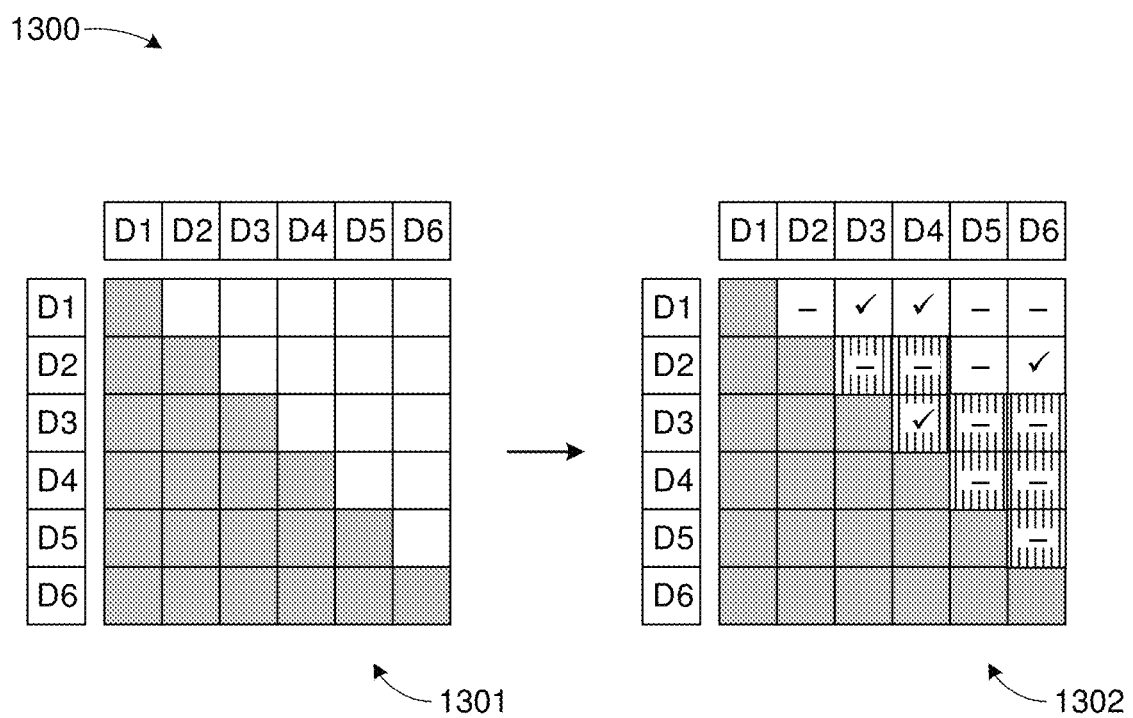
FIG. 13 is a diagram illustrating an example variation of the third method according to the disclosed technologies.

FIG. 13 is a diagram 1300 illustrating an example variant of the third method. Instead of maintaining lists Lm, Ld, this variant initializes and populates a table indicating matches among the various pairs of datasets {D}, to obtain results which are equivalent to lists Lm, Ld described herein, or from which lists Lm, Ld can be calculated.

In this illustration, table 1301 can be initialized as shown. Table 1301 has rows and columns indicating datasets to be tested. Thus, the fourth cell of the third row represents a comparison between D3 (third row) and D4 (fourth column), which can be denoted as D3×D4. The variant method seeks to fill in the unshaded cells of table 1301. Because comparison is commutative (D3×D4 same as D4×D3) and reflexive (Di matches itself), the shaded cells are superfluous. Table 1301 can be initialized in lieu of block 1120 of FIG. 11.

Table 1302 can be gradually filled in based on results of decision block 1140. As D1 is found to match D3 and then D4, indications of these matches can be entered, and are depicted as check marks (v) in table 1302. Writing match entries into table 1302 can be performed in lieu of block 1150. Similarly, mismatches are shown as dashes (-) in table 1302 and can be entered at an additional process block (not shown) along the N branch from block 1140 to block 1160. Accordingly, the unshaded cells of table 1301 can be filled in gradually to obtain table 1302.

In table 1302, some filled cells are shown with vertical hatching, indicating that these cells can be filled based on other unhatched cells, without performing additional comparisons. For example, because D1 matches D3, D4, but does not match D2, two entries in the D2 row can be made without performing comparisons D2×D3 or D2×D4. Then, because D3, D4 match D1, entries in the D3, D4 rows can simply be copied from the D1 row above. Finally, the cell for D5×D6 can be copied from D2×D5 because D2 and D6 were already found to match.

Example Use Cases

Inasmuch as requirements for flexibility and verification are pervasive in database deployments, use cases for the disclosed technologies abound.

In one example, accounting standards vary from one country to another, hence there can be a requirement to apply different standards for valuing e.g. goodwill in financial journals for a multinational organization in respective countries. At the same time, in most instances, the recorded financial data can be expected to match. Further, because the journals can be maintained separately, numerous disparities between deprecated fields can also be expected. The disclosed technologies can be used to verify consistency of relevant data across journals in different countries.

In another example, manufacturing and environmental regulations can vary from one country to another, hence there can be a requirement to check different standards for compliance for a product, process, or organization in respective countries. At the same time, in most instances, the underlying product, process, or organizational data can be expected to be the same. Further, because the databases can be maintained separately in different counties, numerous disparities between deprecated fields can also be expected. The disclosed technologies can be used to verify consistency of relevant data across database versions in different countries.

In a further example, legacy software applications are often phased out due to obsolescence of underlying software technologies. In some instances, new and old systems can be maintained independently, with separate databases, for a transition period. Underlying relevant data can be expected to be the same, albeit with possibly different organization. Verification that the separately maintained databases match (with regard to relevant content) can be required for validation of the software transition. Further, because underlying technologies are different, numerous deprecated fields can be present with associated disparities. It can be desirable to retain deprecated data (e.g. in a derived table such as 105) to help trace back any mismatches found. The disclosed technologies can be used to verify consistency of relevant data across legacy and new databases.

A Generalized Computer Environment

Figure 14:
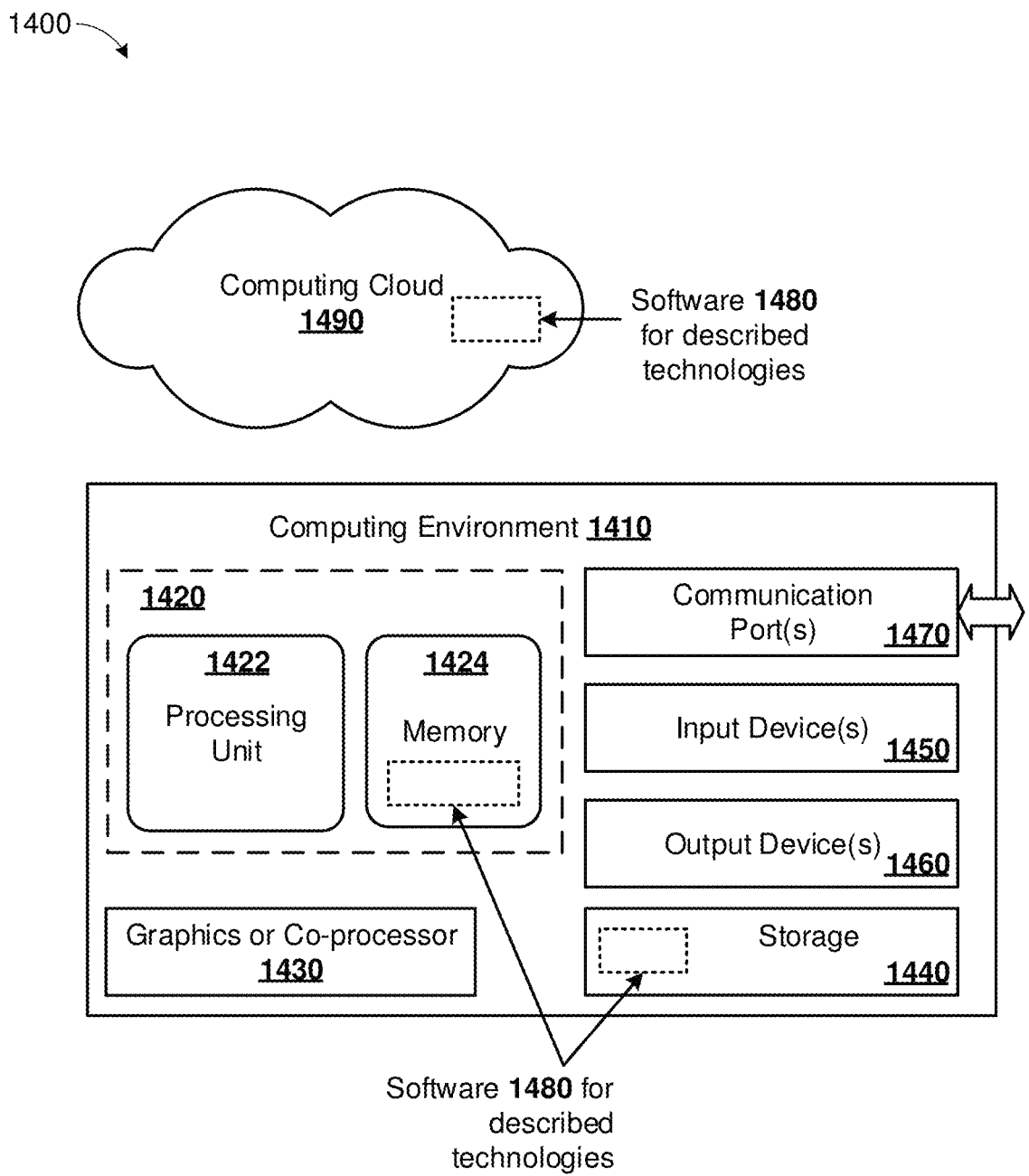
FIG. 14 is a diagram schematically depicting a computing environment suitable for implementation of disclosed technologies.

FIG. 14 illustrates a generalized example of a suitable computing system 1400 in which described examples, techniques, and technologies, including construction, deployment, operation, and maintenance of software tools for comparison of datasets, or components thereof, can be implemented according to disclosed technologies. The computing system 1400 is not intended to suggest any limitation as to scope of use or functionality of the present disclosure, as the innovations can be implemented in diverse general-purpose or special-purpose computing systems.

With reference to FIG. 14, computing environment 1410 includes one or more processing units 1422 and memory 1424. In FIG. 14, this basic configuration 1420 is included within a dashed line. Processing unit 1422 executes computer-executable instructions, such as for implementing any of the methods or objects described herein for comparing datasets, or various other architectures, components, handlers, managers, modules, or services described herein. Processing unit 1422 can be a general-purpose central processing unit (CPU), a processor in an application-specific integrated circuit (ASIC), or any other type of processor. In a multi-processing system, multiple processing units execute computer-executable instructions to increase processing power. Computing environment 1410 can also include a graphics processing unit or co-processing unit 1430. Tangible memory 1424 can be volatile memory (e.g., registers, cache, or RAM), non-volatile memory (e.g., ROM, EEPROM, or flash memory), or some combination thereof, accessible by processing units 1422, 1430. The memory 1424 stores software 1480 implementing one or more innovations described herein, in the form of computer-executable instructions suitable for execution by the processing unit(s) 1422, 1430. The memory 1424 can also store tabular datasets, serialized datasets, projections of datasets, hash values, signatures, identifiers of selected subsets of fields, requests, request parameters, reports; configuration data; data structures including data tables, working tables, change logs, output structures, as well as other operational data.

A computing system 1410 can have additional features, such as one or more of storage 1440, input devices 1450, output devices 1460, or communication ports 1470. An interconnection mechanism (not shown) such as a bus, controller, or network interconnects the components of the computing environment 1410. Typically, operating system software (not shown) provides an operating environment for other software executing in the computing environment 1410, and coordinates activities of the components of the computing environment 1410.

The tangible storage 1440 can be removable or non-removable, and includes magnetic disks, magnetic tapes or cassettes, CD-ROMs, DVDs, or any other medium which can be used to store information in a non-transitory way and which can be accessed within the computing environment 1410. The storage 1440 stores instructions of the software 1480 (including instructions and/or data) implementing one or more innovations described herein.

The input device(s) 1450 can be a mechanical, touch-sensing, or proximity-sensing input device such as a keyboard, mouse, pen, touchscreen, trackball, a voice input device, a scanning device, or another device that provides input to the computing environment 1410. The output device(s) 1460 can be a display, printer, speaker, optical disk writer, or another device that provides output from the computing environment 1410.

The communication port(s) 1470 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1400 can also include a computing cloud 1490 in which instructions implementing all or a portion of the disclosed technology are executed. Any combination of memory 1424, storage 1440, and computing cloud 1490 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 15:
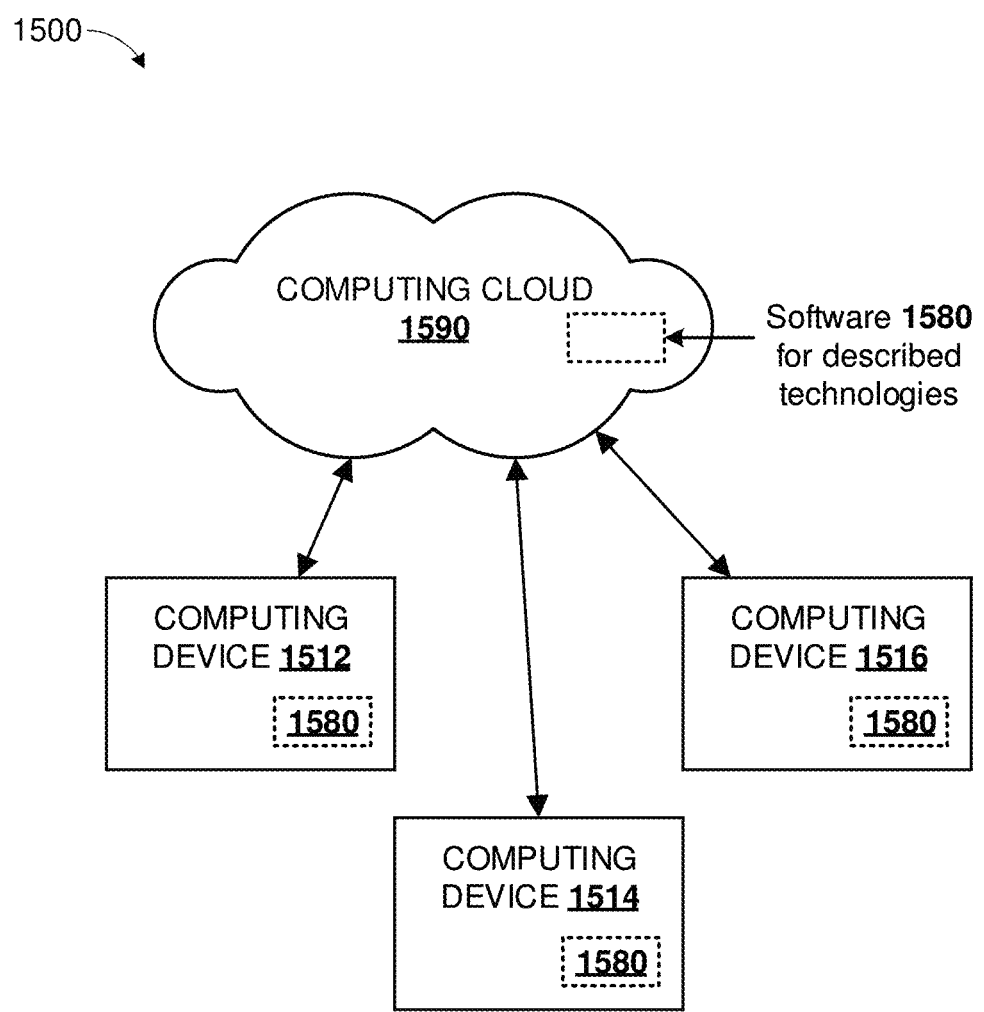
FIG. 15 is a diagram schematically depicting computing devices operating in conjunction with a computing cloud for implementation of disclosed technologies.

FIG. 15 depicts an example cloud computing environment 1500 in which the described technologies can be implemented. The cloud computing environment 1500 comprises a computing cloud 1590 containing resources and providing services. The computing cloud 1590 can comprise various types of cloud computing resources, such as computer servers, data storage repositories, networking resources, and so forth. The computing cloud 1590 can be centrally located (e.g., provided by a data center of a business or organization) or distributed (e.g., provided by various computing resources located at different locations, such as different data centers and/or located in different cities or countries).

The computing cloud 1590 can be operatively connected to various types of computing devices (e.g., client computing devices), such as computing devices 1512, 1514, and 1516, and can provide a range of computing services thereto. One or more of computing devices 1512, 1514, and 1516 can be computers (e.g., servers, virtual machines, embedded systems, desktop, or laptop computers), mobile devices (e.g., tablet computers, smartphones, or wearable appliances), or other types of computing devices. Communication links between computing cloud 1590 and computing devices 1512, 1514, and 1516 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1512, 1514, and 1516 can also be connected to each other.

Computing devices 1512, 1514, and 1516 can utilize the computing cloud 1590 to obtain computing services and perform computing operations (e.g., data processing, data storage, and the like). Particularly, software 1580 for performing the described innovative technologies can be resident or executed in the computing cloud 1590, in computing devices 1512, 1514, and 1516, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "apply," "calculate," "combine," "compare," "compute," "concatenate," "count," "derive," "determine," "disregard," "evaluate," "extract," "generate," "identify," "initialize," "iterate," "obtain," "parse," "perform," "receive," "reject," "report," "request," "respond," "return," "retrieve," "select," "send," "serialize," "set," "store," "transmit," "update," or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 14, computer-readable storage media include memory 1424, and storage 1440. The terms computer-readable storage media or computer-readable media do not include signals and carrier waves. In addition, the terms computer-readable storage media or computer-readable media do not include communication ports (e.g., 1470) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the disclosed technologies and should not be taken as limiting the scope of the claims. Rather, the scope of the invention is defined by the following claims. I therefore claim as my invention all that comes within the scope and spirit of these claims.

I claim:

1. One or more computer-readable media storing instructions which, when executed by one or more hardware processors, cause the one or more hardware processors to perform operations comprising:
   receiving a first data block comprising a plurality of records extracted from one or more database tables, each record having a plurality of significant fields and, complementary to the significant fields, one or more deprecated fields;
   serializing the plurality of significant fields of the plurality of records to obtain a sequence of tokens in text format, each token being an atomic component of text having a semantic meaning, wherein the deprecated fields are common to each of the records and the serializing disregards the deprecated fields;
   applying one or more hash functions to the sequence of tokens to compute a first signature over the plurality of records in the first data block, wherein the computation of the first signature disregards the deprecated fields;
   receiving a request to compare the first data block with a second data block;
   comparing the first signature with a second signature of the second data block;
   responsive to a first determination that the first signature matches the second signature, returning a match indication in response to the request; and
   responsive to a second determination that the first signature does not match the second signature:
      tracing the second determination to specific mismatched records of the first data block; and
      returning, in response to the request, a mismatch indication comprising identifiers of all records of the first data block not matching corresponding records of the second data block.

2. The one or more computer-readable media of claim 1, wherein the computing the first signature precedes the receiving the request.

3. The one or more computer-readable media of claim 1, wherein the mismatch indication is a first mismatch indication, and the operations further comprise:
   responsive to the receiving a request, comparing a first cardinality of the records in the first data block with a second cardinality of records in the second data block; and
   responsive to the comparing of the first and second cardinalities resulting in a cardinality mismatch, returning a second mismatch indication in response to the request;
   wherein the comparing the first signature with the second signature is performed responsive to the comparing of the first and second cardinalities resulting in a cardinality match.

4. A computer-implemented method, comprising:
   receiving a first data block comprising a plurality of records extracted from one or more database tables, each record having a plurality of significant fields and, complementary to the significant fields, one or more deprecated fields;
   serializing the plurality of significant fields of the plurality of records to obtain a sequence of tokens in a text format, each token being an atomic component of text having a semantic meaning, wherein the deprecated fields are common to each of the records and the serializing disregards the deprecated fields;
   applying one or more hash functions to the sequence of tokens to compute a first signature over the plurality of records in the first data block, wherein the computation of the first signature disregards the deprecated fields;

receiving a request to compare the first data block with a second data block;

comparing the first signature with a second signature of the second data block;

responsive, in at least a first case, to a first determination that the first signature matches the second signature, returning a match indication in response to the request; and responsive, in at least a second case, to a second determination that the first signature does not match the second signature:

tracing the second determination to specific mismatched records of the first data block; and returning, in response to the request, a mismatch indication comprising identifiers of all records of the first data block not matching corresponding records of the second data block.

5. The method of claim 4, wherein the text format is JSON format.

6. The method of claim 4, further comprising computing the first signature from a plurality of individual signatures for respective records of a first set of the records in the first data block, each of the individual signatures being computed over all fields of the significant fields belonging to the respective record.

7. The method of claim 6, wherein the request is a first request, and the method further comprises:

storing the first signature on a non-transitory storage medium; and responsive to a second request to compare the first data block with a third data block, the second request being received from a client subsequent to the storing:

retrieving the first signature from the non-transitory storage medium; and comparing the first signature with a third signature of the third data block; and returning to the client a result of the comparing the first and third signatures.

8. The method of claim 6, wherein the first signature is independent of an order of the individual signatures.

9. The method of claim 6, wherein the first signature is sensitive to an order of the individual signatures.

10. The method of claim 4, further comprising, prior to the comparing:

retrieving identifiers of the significant fields from stored metadata.

11. The method of claim 4, wherein the request is a first request, and the method further comprises:

storing the first signature;

receiving a second request to update one or more records of the plurality of records in the first data block; and responsive to a further determination that the first signature exists, rejecting the second request.

12. A system comprising:

one or more hardware processors with memory coupled thereto; and computer-readable media storing instructions which, when executed by the one or more hardware processors, cause the one or more hardware processors to perform operations comprising:

receiving a first data block comprising a plurality of records extracted from one or more database tables, each record having a plurality of significant fields and, complementary to the significant fields, one or more deprecated fields;

serializing the plurality of significant fields of the plurality of records to obtain a sequence of tokens in text format, each token being an atomic component of text having a semantic meaning, wherein the deprecated fields are common to each of the records and the serializing disregards the deprecated fields;

applying one or more hash functions to the sequence of tokens to compute a first signature over the plurality of records in the first data block, wherein the computation of the first signature disregards the deprecated fields;

receiving a request to compare the first data block with a second data block;

comparing the first signature with a second signature of the second data block;

responsive to a first determination that the first signature matches the second signature, returning a match indication in response to the request; and responsive to a second determination that the first signature does not match the second signature:

tracing the second determination to specific mismatched records of the first data block; and returning, in response to the request, a mismatch indication comprising identifiers of all records of the first data block not matching corresponding records of the second data block.

13. The system of claim 12, wherein the first data block and the second data block are among a plurality of at least three analogous data blocks, stored in a database environment which includes the one or more database tables.

14. The system of claim 13, wherein:

the first data block is a reference data block;

the request further indicates comparison of the reference data block with at least one additional data block, in addition to the second data block, among the analogous data blocks; and the comparing is performed pairwise, each pair comprising (a) the reference data block and (b) another data block among the analogous data blocks.

15. The system of claim 12, wherein:

the request specifies comparisons among a plurality of analogous data blocks including the first and second data blocks;

the operations further comprise reporting matching data blocks, among the analogous data blocks, and one or more distinct data blocks, among the analogous data blocks, wherein:

each of the matching data blocks is matched to at least one other data block among the analogous data blocks; and each of the one or more distinct data blocks lacks any match among the analogous data blocks.

16. The system of claim 12, wherein:

the significant fields and the deprecated fields together constitute fields of each record;

the plurality of significant fields is a first subset of the fields;

a storage unit is configured to store, for a given data block of the first and second data blocks, corresponding signatures for multiple subsets of the fields; and the operations further comprise parsing the received request to identify a particular subset of the fields, among the multiple subsets of the fields, which identify the significant fields.

17. The system of claim 12, wherein the one or more database tables are part of a relational database environment.

* * * * *